N. BEAUREGARD.
Disengaging Clutch Couplings for Shafting.
No. 196,516. Patented Oct. 30, 1877.
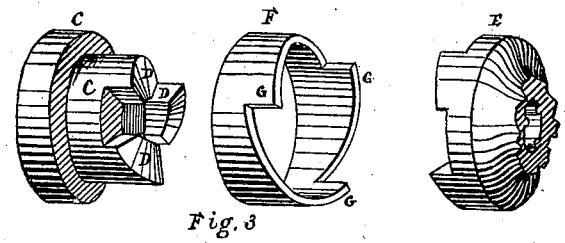
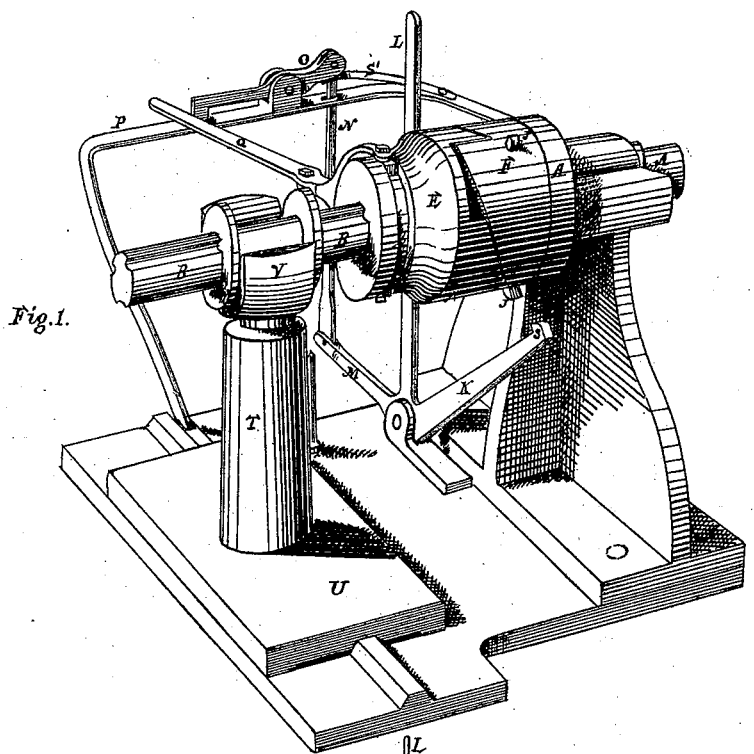
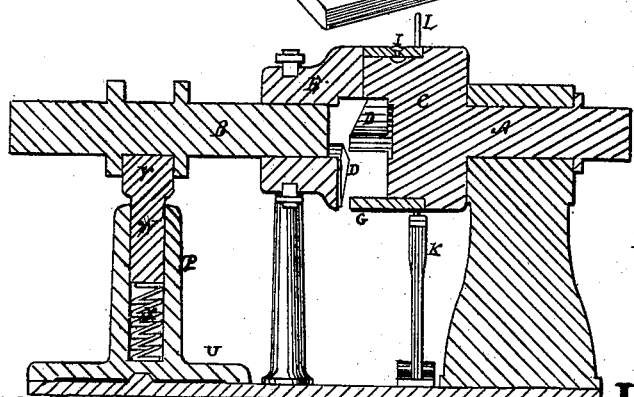
Witnesses
Geo. H. Strong.
Edwyn T. Stacy
Inventor
Napoleon Beauregard
By his Att'ys
Dewey & Co.

UNITED STATES PATENT OFFICE.

NAPOLEON BEAUREGARD, OF SAN FRANCISCO, CALIFORNIA, ASSIGNOR OF ONE-HALF FHIS RIGHT TO BURROUGHS P. BRUNNER, OF SAME PLACE.

IMPROVEMENT IN DISENGAGING CLUTCH-COUPLINGS FOR SHAFTING.

Specification forming part of Letters Patent No. 196,516, dated October 30, 1877; application filed August 13, 1877.

*To all whom it may concern:*

Be it known that I, NAPOLEON BEAUREGARD, of the city and county of San Francisco, and State of California, have invented an Improved Device for Connecting and Disconnecting Horizontal Shafting; and I do hereby declare the following to be a full, clear, and exact description thereof, reference being had to the accompanying drawings.

The first part of my invention relates to an improved clutch-coupling for connecting and disconnecting the meeting ends of line-shafting.

My improvement consists in providing an arrangement, in connection with an ordinary interlocking clutch, by which the parts of the clutch can be automatically thrown out of gear, and the two shafts disconnected, while the shafting is in motion and under strain.

The second part of my invention relates to a novel bearing for supporting the end of the line-shaft upon which the shifting-clutch is placed, all as hereinafter more fully described.

Referring to the accompanying drawings, Figure 1 is a perspective view. Fig. 2 is a longitudinal section, and Fig. 3 portions of the clutch detached.

Let A represent a horizontal shaft, which is connected with and driven by an engine or other motive power; and B, a horizontal shaft, which is mounted in the same line, so that the ends of the two shafts will be close together.

Preliminarily, I will state that the principal use to which it is intended to apply the inventions herein described is in combination with the line-shafting of rolling-mills; but they can be also applied wherever it is desirable or may become necessary to disconnect a shaft when it is in motion and under strain.

The instance of the application to a rolling-mill is specially referred to because the conditions under which the devices operate will be better understood with reference thereto.

In a rolling-mill the shaft A is connected with the engine or power, and the shaft B transmits the power and motion to the rolls.

The nature of the work done by the rolls of a rolling-mill frequently causes strains upon the rolls and shafting, which necessitates an immediate disconnection of the coupling which connects the shafts. My improved clutch is intended to accomplish this purpose.

The permanent portion C of the clutch is attached to the end of the shaft A, and has one or more lugs or projections, D, on its outer face, while the sliding clutch-box E, which moves on the end of the shaft B, has corresponding lugs or projections which interlock with the projections D when the box E is moved against the portion C, in the usual manner of operating clutches.

The outer portion of the permanent half C of the clutch I make smaller in diameter than the half E, and around this reduced portion I place a band, F, the outer edge of which has one or more inclined ratchet-like teeth, G, the depth of which corresponds with the height of the projections D on the clutch.

As many of these ratchets or inclined teeth can be used as there are projections on the clutch portion; but a single tooth will answer, as will be more fully understood hereinafter.

The outer ends of the projections D must be made inclined or sloping to correspond with the inclined edges of the teeth on the band when they are together. This band rotates freely around the portion C of the clutch and independent of it, and is held in place by one or more screws, I, which enter a groove in the clutch, as represented.

The band F has one or more projecting lugs, J, on its outer face, so that by applying a brake to the outside of the band when the shaft is in motion, the brake will engage with one of these projections, and hold the band stationary while the clutch rotates inside of it. Now, when the two parts of the clutch are in engagement, the band F will accommodate itself to the position of the projections D and rotate with the clutch; but if the brake is brought into contact with one of the lugs J the band will be held stationary while the clutch rotates inside of it. The continued rotation of the shaft causes the outer edges of the interlocking projections on the sliding portion of the clutch to move against the inclined edges of the ratchet-teeth on the band. The sliding portion of the clutch will thus be forced outward and out of engagement with the projections of the permanent half of the clutch, so as to disconnect the two parts, the entire operation being accomplished while the shaft is in motion and under strain.

The brake which I use consists of a triple lever, consisting of the three parts K L M, which branch from a single point. The point of junction is pivoted to the floor or base beneath the permanent portion of the clutch, and the arm K extends underneath the clutch, being bent slightly upward, while the opposite arm M extends in an opposite direction, and is connected by a rod, N, with one end of a spring-dog, O, which is pivoted at its middle on a support, P, at one side of the clutch. The part L projects directly upward from the branching or pivoted point, and forms a hand-lever, by which the brake is applied.

Q is the lever which shifts the sliding portion E of the clutch. This lever is pivoted to an upright standard, R, and its handle extends out so as to rest upon the support P beside the outer end of the dog. When the clutches are engaged the end of the lever is on the outside of the dog, and is prevented by it from unshipping the clutches until the dog is lifted. The outer end of the dog O is bent downward, and the spring S' forces it down against the support P, so that it will serve as a stop to prevent the lever Q from shifting it in either of its positions. The outer end of the brake-arm K is also formed into a hook, S, so that when the upper end of the lever L is drawn away from the shaft the extremity of the arm K is thrown up against the band F, so as to engage with one of the lugs J and hold the band stationary. The same movement raises the outer end of the dog O, so that the lever Q can pass under it. The stationary band will then unship the sliding clutch automatically, and the motion of the clutch will shift the lever Q inside of the dog, so that as soon as the lever L is released the dog will drop upon the support P, and secure the lever from being shifted until the lever L is again drawn upon.

This arrangement is quite simple and effective. It enables me to operate the clutch almost instantly and without trouble. At the same time it secures the shipping-lever and prevents it from being accidentally displaced.

Another important feature of my invention is the bearing which supports the end of the connecting-shaft B. This consists of an upright hollow standard, T, which is provided with a broad base, U. This base moves upon a track at right angles to the line of shafting, so that when the clutch is disengaged the connecting-shaft can be moved to one side and repaired, when desired, by simply moving the base and standard along the track.

V is the semicircular box in which the shaft bears. This box has a spindle, W, extending downward into the hollow standard T, and resting upon a spring, X, in the bottom of the bore. This provides an elastic or yielding support for the bearing, which allows the shaft to accommodate itself to the clutch independent of any particular center, and thus saves much wear and tear upon the shaft and coupling.

While these improvements are especially adapted for the shafts in rolling-mills, they may be applied in any place where the objects they attain are desirable.

Having thus described my invention, what I claim, and desire to secure by Letters Patent, is—

1. The permanent clutch-box C, provided with a loose or independent band, F, which is provided with one or more inclined teeth, G, corresponding with the projections on the clutch-box, in combination with the counterpart or sliding clutch-box E and a suitable brake, substantially as and for the purpose described.

2. The loose or independent band F, provided with inclined or ratchet teeth G and lugs J, in combination with a clutch-coupling and brake, K, substantially as and for the purpose described.

3. A clutch-coupling having its permanent portion provided with the independent or loose band F, with its lugs J, in combination with the brake K, lever L, arm M, connecting-rod N, and spring-dog O, all combined and arranged to operate substantially as and for the purpose described.

4. The system of levers K L M, pivoted as described, and connected by the rod N with the dog O, in combination with the shifting-lever Q of the sliding clutch-box, substantially as and for the purpose described.

5. An upright standard, T, provided with a box or other bearing, V, for a horizontal shaft, and having its base U arranged to move upon a track or way at right angles to the shaft, substantially as and for the purpose described.

In witness whereof I have hereunto set my hand and seal.

NAPOLEON BEAUREGARD. [L. S.]

Witnesses:
B. P. BRUNNER,
W. C. WILCOX.